United States Patent
Habash

(10) Patent No.: US 9,288,567 B1
(45) Date of Patent: Mar. 15, 2016

(54) AUDIO PHONE CONNECTION MOUNT FOR TOUCH PEN

(71) Applicant: Abduljalil K. H. Habash, Safat (KW)

(72) Inventor: Abduljalil K. H. Habash, Safat (KW)

(*) Notice: Subject to any disclaimer, the term of this patent is extended or adjusted under 35 U.S.C. 154(b) by 0 days.

(21) Appl. No.: 14/877,895

(22) Filed: Oct. 7, 2015

(51) Int. Cl.
*H04R 1/10* (2006.01)
*H04R 5/04* (2006.01)
*H04R 1/02* (2006.01)
*G06F 3/0354* (2013.01)

(52) U.S. Cl.
CPC .......... *H04R 1/1041* (2013.01); *G06F 3/03545* (2013.01); *H04R 1/028* (2013.01); *H04R 5/04* (2013.01); *H04R 2201/103* (2013.01); *H04R 2420/09* (2013.01)

(58) Field of Classification Search
CPC ........ H04R 1/1041; H04R 1/028; H04R 5/04; H04R 2201/103; H04R 2420/09; G06F 3/03545; G06F 3/03542; G06F 3/0386; G06F 3/016; G06F 3/0414
USPC .................... 381/123, 309, 74, 334; 345/179; 361/679.01, 679.23
See application file for complete search history.

(56) References Cited

U.S. PATENT DOCUMENTS

| | | | |
|---|---|---|---|
| 8,659,581 B2 * | 2/2014 | Lin ..................... | G06F 3/03545 178/19.01 |
| 8,964,379 B2 | 2/2015 | Rihn et al. | |
| 2010/0215183 A1 * | 8/2010 | Hansson ............. | H04R 1/1033 381/58 |
| 2011/0281617 A1 * | 11/2011 | Kim ...................... | G06F 1/1656 455/556.1 |
| 2012/0040713 A1 * | 2/2012 | Wang .................... | G06F 3/0216 455/550.1 |
| 2013/0301200 A1 | 11/2013 | Leung | |
| 2014/0009409 A1 * | 1/2014 | Wang ...................... | G06F 3/033 345/173 |
| 2014/0049851 A1 | 2/2014 | Snell et al. | |
| 2014/0192029 A1 | 7/2014 | Heo | |
| 2014/0297539 A1 | 10/2014 | Swamy et al. | |
| 2015/0015547 A1 | 1/2015 | Lin | |
| 2015/0035809 A1 * | 2/2015 | Kim ..................... | G06F 1/1656 345/179 |
| 2015/0049065 A1 | 2/2015 | Chen | |

FOREIGN PATENT DOCUMENTS

| | | | | |
|---|---|---|---|---|
| KR | 10-2014-0035054 | * | 3/2014 | ............. G06F 3/033 |
| KR | 20140035054 A | | 3/2014 | |

* cited by examiner

*Primary Examiner* — Vivian Chin
*Assistant Examiner* — Jason R Kurr
(74) *Attorney, Agent, or Firm* — Richard C. Litman

(57) ABSTRACT

The audio phone connection mount for touch pen is an adapter assembly connectable to portable/mobile electronic devices, such as smart phones or tablets, whereby a mechanical attachment is established between a touch pen/stylus or normal pen and the device's 3.5 mm audio jack, while simultaneously allowing electro-mechanical connection of headsets and headphones to the electronic device. Various embodiments of the adapter permit its use with the four most prevalent types of smart phones on the market. The touch pen itself will be modified to accommodate their connections. In a generic aspect, the adapter includes a pivotal 3.5 mm connector for engaging the audio jack of the electronic device, while the pen includes an adapter on one end that will connect to the 3.5 mm male audio connectors attached to the external audio devices.

5 Claims, 5 Drawing Sheets

AUDIO PHONE CONNECTION MOUNT FOR TOUCH PEN

BACKGROUND OF THE INVENTION

1. Field of the Invention

The present invention relates to portable electronic devices, and particularly to an audio phone connection mount for touch pen that includes an adapter assembly that connects a touch pen/stylus or normal pen to the device's 3.5 mm audio connector while simultaneously allowing connection of headsets and headphones to the electronic device

2. Description of the Related Art

Touch pens and styluses that are attached to a tablet and/or smartphone for transport by inserting a nonfunctional plug into the device's 3.5 mm phone connection are sold at retail and are also widely distributed as free promotional items. However, use of the 3.5 mm phone connection to attach a touch pen for storage or transport precludes its normal use for connection of a headset or headphones.

Thus, an audio phone connection mount for touch pen solving the aforementioned problems is desired.

SUMMARY OF THE INVENTION

The audio phone connection mount for touch pen is an adapter assembly connectable to portable electronic device, such as a smart phone or tablet, whereby a mechanical connection is established between a touch pen/stylus or normal pen and the device's 3.5 mm audio jack while simultaneously allowing electro-mechanical connection of headsets and headphones to the electronic device. Various embodiments of the adapter are envisioned that would permit its use with the four most prevalent types of smart phones on the market. The electronic device and the touch pen itself will be modified to accommodate their connections. In a generic aspect, the adapter includes a pivotal 3.5 mm connector for engaging the audio jack of the electronic device, while the pen includes an adapter on one end that will receive the 3.5 mm male plug connectors attached to the external audio devices.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The audio phone connection mount for touch pen is an adapter assembly connectable to portable/mobile electronic device, such as a smart phone or tablet, whereby a mechanical attachment is established between a touch pen/stylus or normal pen and the device's 3.5 mm audio connector for storage or transport, while simultaneously allowing electro-mechanical connection of headsets and headphones to the electronic device. Various embodiments of the adapter are envisioned that would permit its use with the four most prevalent types of smart phones on the market. The touch pen itself will be modified to accommodate connection to the electronic device. In a generic aspect, the adapter includes an electrical connection component which may be, for example, a pivotal 3.5 mm connector for engaging the audio jack of the electronic device, while the pen includes an adapter on one end that will receive to the 3.5 mm miniature male connectors attached to the external audio devices.

Figure 1:
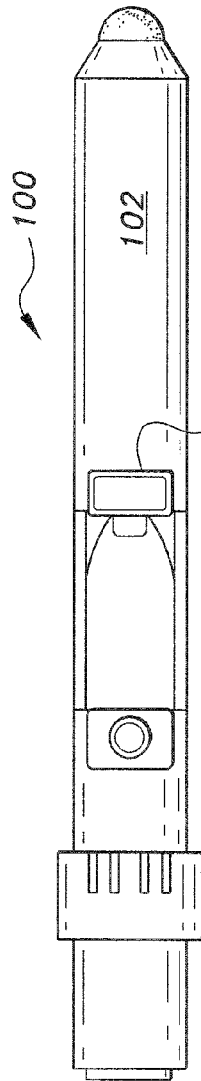
FIG. 1 is a front view an audio phone connection mount for touch pen according to the present invention, shown with the phone plug retracted.
Figure 2:
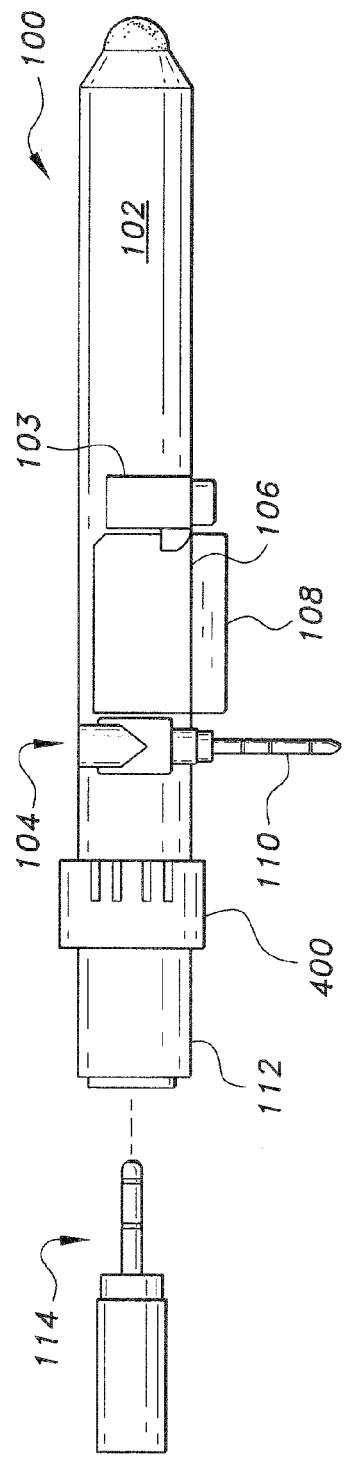
FIG. 2 is a side view of the audio phone connection mount for touch pen of FIG. 1, shown with the phone plug extended.

FIGS. 1 and 2 show the complete body of the touch pen/stylus or normal pen, which is attachable to the mobile electronic device. Button 103 is configured so that pushing the button 103 pivots the male connector 110 outward through 90° of rotation to lock in an extended position away from the pen body 102 while connecting it to the desired device. The connector 110 is a plug that can plug into a corresponding jack of the desired device, thereby securing the touch pen/stylus to the tablet, smartphone, of other device for storage or transport.

Figure 6:
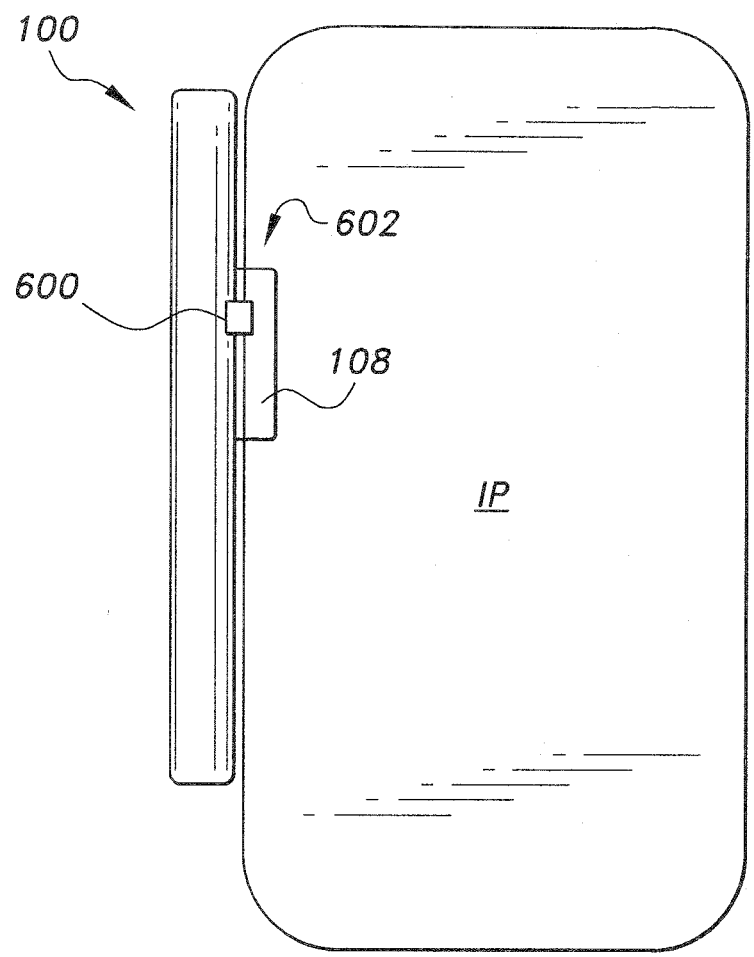
FIG. 6 is an environmental front view of an audio phone connection mount for touch pen according to the present invention, shown attached to a mobile device.
Figure 7:
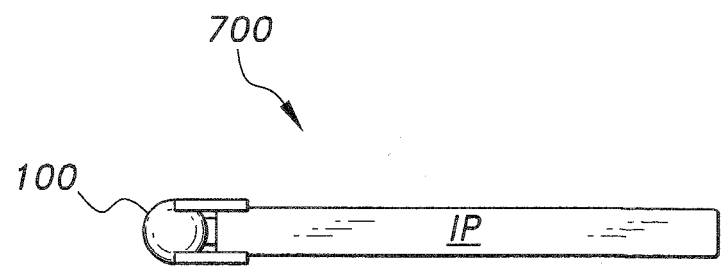
FIG. 7 is an environmental top view of the audio phone connection mount for touch pen of FIG. 6, showing another view of the attachment to a mobile device.

A recessed area in the stylus 100 defines a storage compartment 104 that stores the connector 110 in a locked, retracted position, since there is no need for the connector when using the pen. Additionally, the storage compartment 104 has side doors that hide the connector 110 when inside the recessed area and would add additional support to the pen 100 and prevent it from moving radially when connected to any device. The final configurations should hold the pen 100 when connected to the device's 3.5 mm connector firmly alongside of the device's body, as shown in FIGS. 6 and 7.

A small extension 106 from the button 103 is stationed to hold the connector 110, and pushing the button 103 would release it.

The side doors 108 would act to hide the connector 110 when inside the storage compartment 104, and when the connector 110 is out, the side doors 108 prevent the pen from rotation by holding the pen alongside the body frame of the device it is connected to.

Figures 5A, 5B, 5C, 5D:
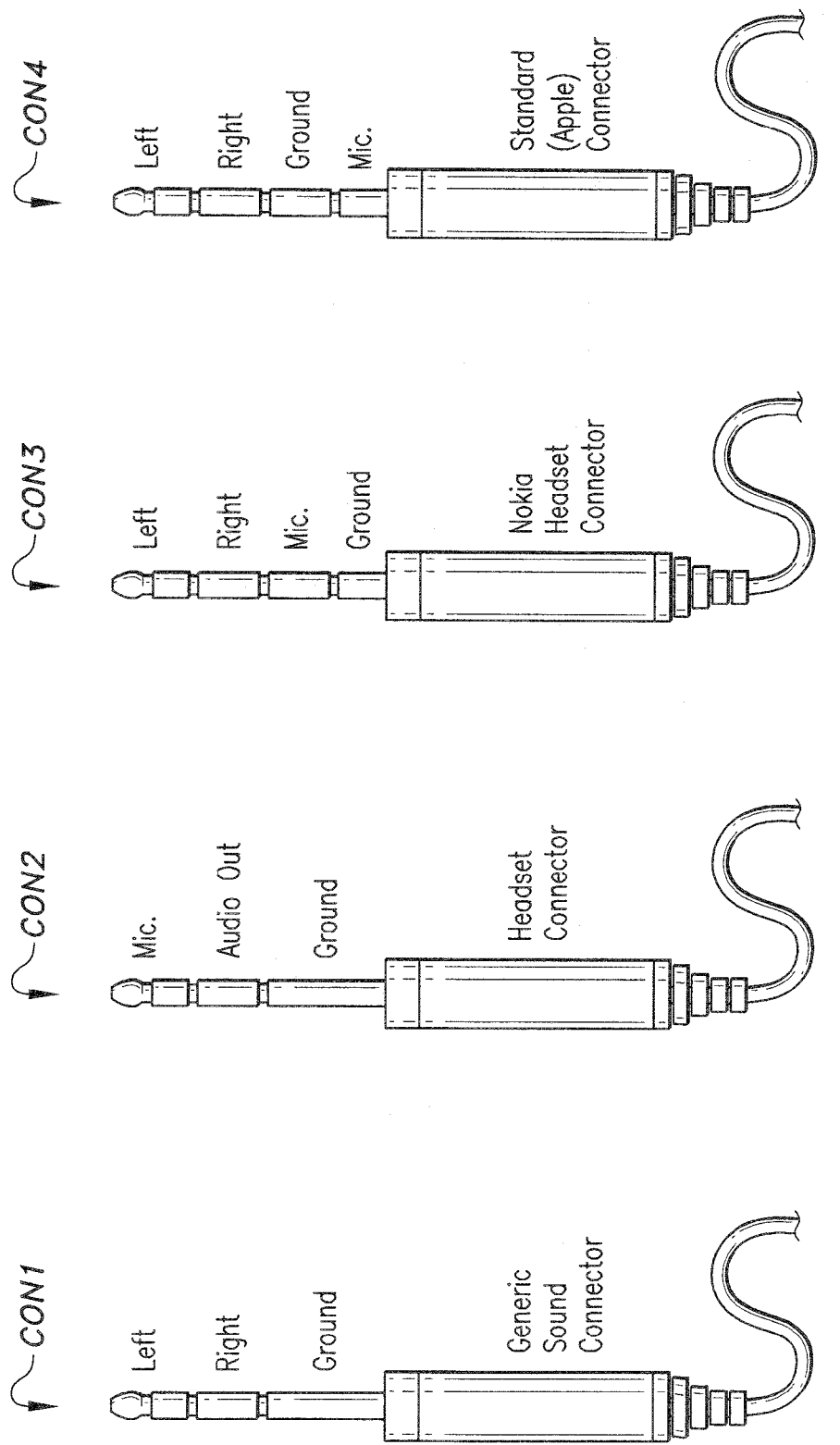
FIG. 5A is a CON1 configuration of an exemplary generic three-conductor male miniature phone connector.
FIG. 5B is a CON2 configuration of an exemplary three-conductor male miniature headset connector.
FIG. 5C is a CON3 configuration of an exemplary Nokia® (Nokia is a registered trademark of Nokia Corporation of Finland) four-conductor male miniature phone connector.
FIG. 5D is a CON4 configuration of an exemplary Apple computer four-conductor male miniature phone connector.

The 3.5 mm miniature male connector 110 is compatible with the four required configurations (CON1 of FIG. 5A, CON2 of FIG. 5B, CON3 of FIG. 5C, and CON4 of FIG. 5D). Also, the connector 110 is connected to the pen body 102 using two side hinges that have a spring mechanism that bias the connector 110 outward. When in storage, the extension 106 and the side doors 108 retain the connector 110 from springing out.

A bypass or feed-through interface adapter 112 is located on the back of the pen (opposite the tip) and is wired as a receptacle or jack that allows for connection of a headset, speaker, or other audio accessory to the tablet or smartphone in a manner that is compatible with four selectable configurations (CON1, CON2, CON3, and CON4). See the example in FIG. 2 of how the external audio device 114 connects to the pen 102 via the bypass interface 112.

Figure 3:
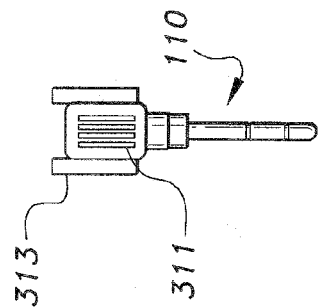
FIG. 3 is a front view of the male connector of the audio phone connection mount for touch pen according to the present invention.

FIG. 3 shows how the connector 110 connects to the smart devices. It is connected to the main multi-function adapter 400 (shown in FIGS. 2 and 4) and is in charge of signal delivery from a peripheral device via the bypass interface adapter 112 and through to the audio jack of the tablet, smart phone, or other electronic device. Hinges 313 allow the connector 110 to rotate 90°, and also include a spring mechanism that bias the connector 110 outward. The signal delivery portion of the wiring 311 changes its configuration, depending on the setting of multi-function adapter 400.

Figure 4:
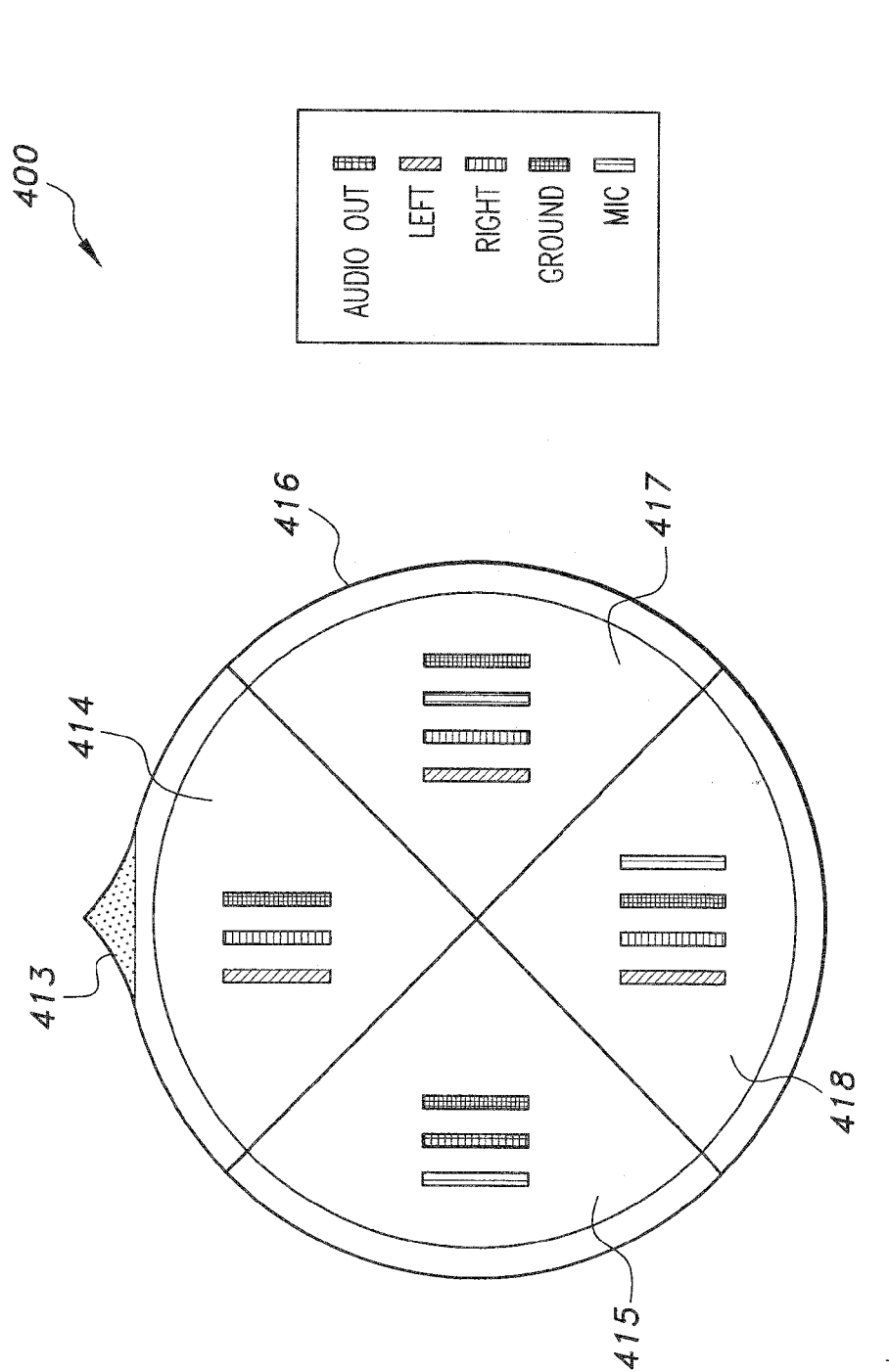
FIG. 4 is a front view of the selector of the audio phone connection mount for touch pen according to the present invention.

As shown in FIG. 4, the multi-function adapter 400 includes a rotary dial switch that selects one of the four most used wiring configurations (CON1, CON2, CON3, and CON4) for audio devices in the market, and rotates clockwise or counter clockwise to the desired setting based on the schemata available on CON. For example, the CON1 wiring configuration provides, in order, left channel, right channel, and ground connections of the peripheral device to the audio jack, corresponding to the Tip, Ring, Sleeve (TRS) configuration of the plug of FIG. 5A. The CON2 wiring configuration provides, in order, microphone, audio out, and ground connections of the peripheral device to the audio jack, corresponding to the alternative TRS configuration of the plug of FIG. 5B. The CON3 wiring configuration provides, in order, left channel, right channel, microphone, and ground connections of the peripheral device to the audio jack, corresponding to the Tip, Ring1, Ring2 Sleeve (TRRS) configuration of the plug of FIG. 5C. The CON4 wiring configuration provides, in order, left channel, right channel, ground, and microphone connections of the peripheral device to audio jack, corresponding to the alternative TRRS configuration of the plug of FIG. 5D.

As shown in FIG. 4, a small nib 413 indicates which setting of the multi-function adapter 400 is selected. The first setting 414 selects CON1, which is compatible with generic sound connectors. The second setting 415 selects CON2, which is compatible with headsets. The third setting 417 selects CON3, which is compatible with Nokia headsets. The fourth setting 418 selects CON4, which is compatible with Apple headsets. The outer frame 416 supports rotation with counterclockwise or clockwise action to select the aforementioned CON1, CON2, CON3, and CON4 connections. As shown in FIG. 6, the stylus 100 may be attached to an interface port of the mobile electronic device IP with the storage side doors 108 in an open position 602 and the connector 110 in an attached configuration 600. FIG. 7 shows a top view 700 of the attachment of the stylus 100 to the mobile electronic device IP.

Figure 8:
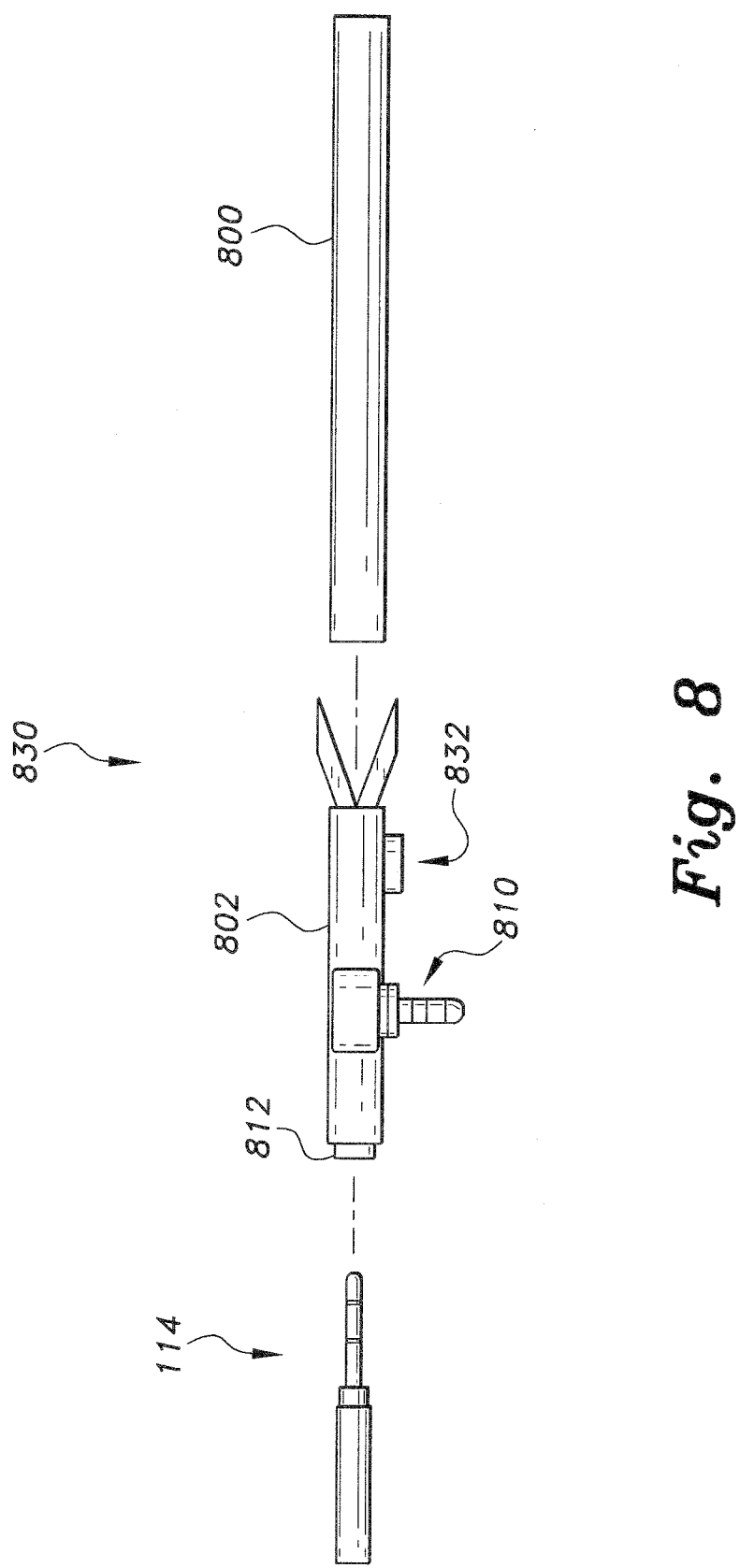
FIG. 8 is a partially exploded side view of an alternative embodiment of an audio phone connection mount for touch pen according to the present invention.

An alternative basic standalone adapter with connector 802 is shown in FIG. 8, and can be a reconfigured adapter with only one invariable setting (CON1, CON2, CON3 or CON4) and a jawed grappling mechanism 830 on one end of adapter 802 to attach to the pen/stylus 800. Inserting the pen/stylus 800 into the jawed grappling mechanism 830 causes the jaws of grappling mechanism 830 to lock into a position that securely grips the pen/stylus 800. Release button 832 is in operable communication with the grappling mechanism 830 to cause the jaws 830 to relax when the release button 832 is pressed. The peripheral plug 114 attaches to receptacle 812 disposed on an opposing end of the standalone adapter 802. The receptacle 812 is wired to the plug 810 to provide electrical connectivity of the peripheral device when peripheral device plug 114 is connected to the receptacle 812 and plug 810 is connected to an audio jack of a mobile electronic device. When so connected, the adapter 802 securely affixes the pen/stylus to the body of the mobile electronic device. It is of note that in this embodiment, the plug 810 is not pivotally extendable. This embodiment is similar to the first embodiment, as the adapter is attached to the pen. However no wiring selection button is used. This line can be specified for promoting targeted products.

Furthermore, an advanced version of the standalone adapter 802 may be equipped with a multifunction connector similar to multifunction connector 400 of the device 100 to provide the four settings (CON1, CON2, CON3, CON4), configured as described above. It should, however, be understood that the advanced version of standalone adapter 802 does not have a pivotally extendable connector.

It is to be understood that the present invention is not limited to the embodiments described above, but encompasses any and all embodiments within the scope of the following claims.

I claim:

1. An audio phone connection mount for touch pen and being adapted for connection to an audio jack of a portable electronic device, comprising:
   a stylus;
   an adapter disposed in the stylus, the adapter having a male audio connector pivotal between an extended position and a position retracted within the stylus, the male audio connector being adapted for connection to an audio jack of a portable electronic device, wherein the male audio connector is configured to be compatible with a plurality of wiring configurations of audio devices; and
   a feed-through interface disposed in the stylus, the feed-through interface including an audio jack in operable electrical communication with the male audio connector, wherein a rotary dial switch has a user selectable position connecting the audio jack between the feed-through interface and the male audio connector, wherein the rotary dial switch selects one of the plurality of wiring configurations, wherein the wiring configurations consist of, in order, a) left channel, right channel, and ground connection, b) microphone, audio out, and ground connection, c) left channel, right channel, microphone, and ground connection, and d) left channel, right channel, ground, and microphone connection;
   whereby the stylus may be mechanically connected to the electronic device for storage and transport, and an audio accessory may be electrically connected to the audio jack of the portable electronic device through the feed-through interface.

2. The audio phone connection mount according to claim 1, wherein the feed-through interface is a 3.5 mm audio jack adapted for receiving a miniature audio plug.

3. The audio phone connection mount according to claim 1, wherein the male audio connector of the adapter comprises a 3.5 mm miniature audio plug.

4. The audio phone connection mount according to claim 1, further comprising side doors disposed on the stylus and covering a recessed area in the stylus when the male audio connector is in the retracted position.

5. The audio phone connection mount according to claim 1, further comprising: a grappling mechanism disposed on an opposing end of the adapter, the grappling mechanism securely gripping a stylus when the stylus is inserted into the grappling mechanism;

and a release button in operable communication with the grappling mechanism to cause the grappling mechanism to release its grip on the stylus when the release button is pressed.

\* \* \* \* \*